Patented Oct. 19, 1926.

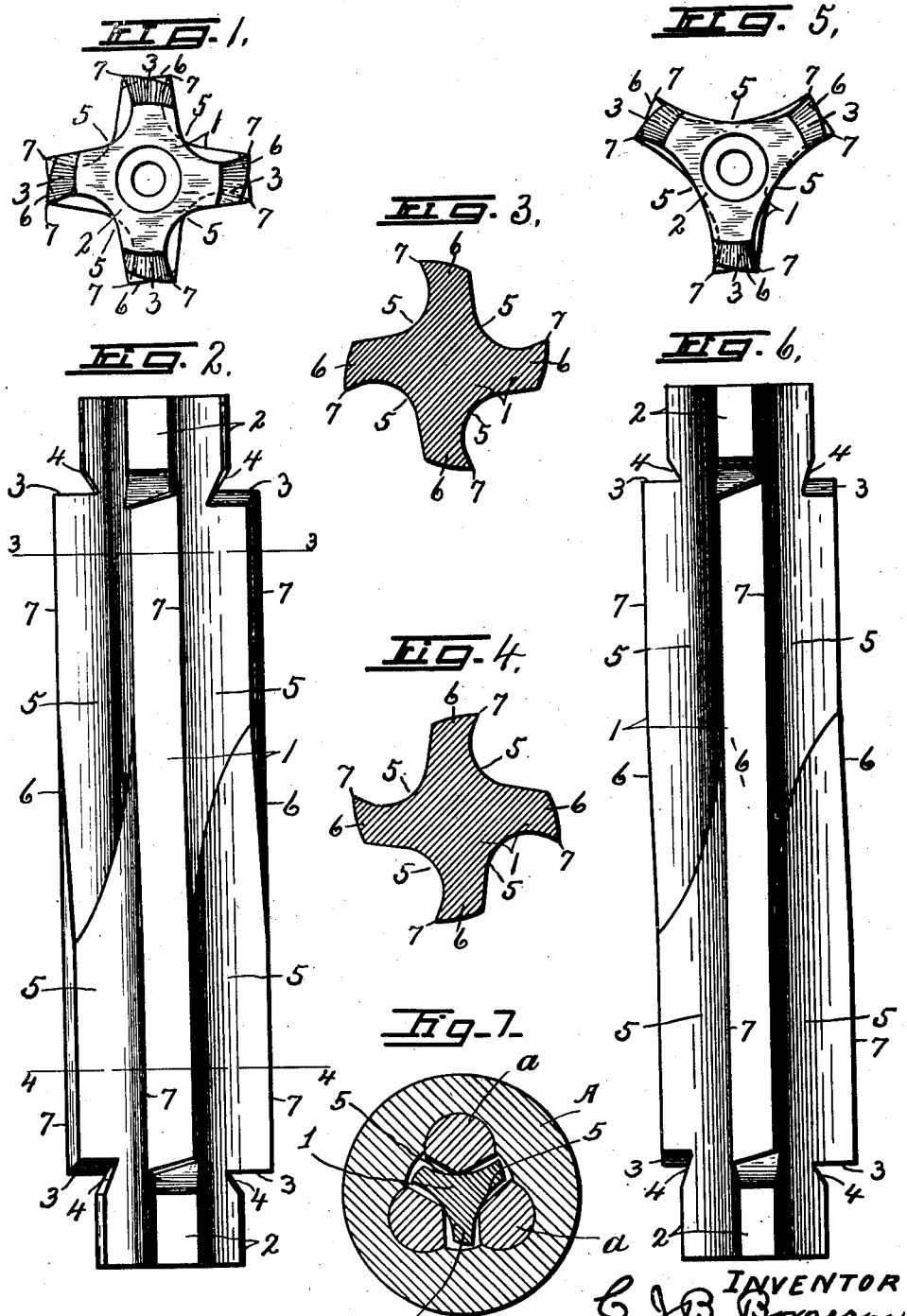

1,603,739

UNITED STATES PATENT OFFICE.

CHARLES J. B. BORGESON, OF SYRACUSE, NEW YORK.

COMBINATION BORING AND END-MILLING TOOL.

Application filed July 2, 1923. Serial No. 649,079.

This invention relates to a combined counterboring, end milling and reaming tool consisting of a single piece of "high speed" steel or other suitable material fluted from end to end and having both ends of similar form and size but with their cutting edges reversed so that either end may be clamped in one and the same chuck and used to perform the same or different operations.
The main object is to provide a double-ended tool of this character in which the flutes or longitudinal grooves are similar and in uniformly spaced relation circumferentially to form ways for receiving the jaws of a chuck whereby the tool may be more firmly held not only coaxial with its axis of rotation but also against accidental rotary slipping movement in the chuck about said axis.
Another object of this regular fluting from end to end is to provide parallel lengthwise ribs also in uniformly spaced relation circumferentially and to form similar but reversely arranged contours on both ends of each rib.

Another object is to provide substantially half the length of the tool from one end with lengthwise cutting edges facing in one direction and the other half from the other end with the lengthwise cutting edges facing in the opposite direction so that either end of the tool may be inserted and held in the chuck and the other end used for reaming or end milling, or other interior or exterior surface milling without liability of injury to the cutting edges of the tool by the jaws of the chuck.

Another object is to provide both ends of the tool with similar pilots to facilitate the center of either end of the tool into the work particularly when used for counterboring.

Other objects and uses relating to specific parts of the tool will be brought out in the following description.
In the drawings, Figures 1 and 2 are respectively, an end view and a side elevation of a four-ribbed tool embodying various features of my invention, adapted to be used with a four-jaw chuck.

Figures 3 and 4 are sectional views taken respectively on lines 3—3, and 4—4, Figure 2.

Figures 5 and 6 are respectively, an end view and a side elevation of a three-ribbed tool also embodying the various features of my invention and adapted to be used in a three-jaw chuck.

Figure 7 is a transverse sectional view of the tool shown in Figures 5 and 6 and the chuck holder therefor.

This tool preferably consists of a single piece or bar of "high speed" steel or equivalent material comprising an elongated main body —1— of substantially uniform cross sectional size from end to end, and reduced pilot portions —2— at both ends of the main body, and also of substantially uniform cross sectional size, thereby forming substantially radial shoulders —3— on both ends of the main body, the inner ends of the pilot sections adjacent the shoulders —3— being cut away to form notches cut at —4— for clearance of the waste material particularly, when the tool is used for counter-boring.

This tool is provided with similar lengthwise flutes or grooves —5— extending from end to end thereof in uniformly spaced relation circumferentially and substantially parallel with the axis of the tool to form a corresponding number of similar lengthwise ribs —6— which are uniformly spaced circumferentially and are substantially parallel with the axis of the tool, the number of flutes and ribs depending somewhat upon the work to be performed but preferably corresponding to the number of jaws as —a— of standard forms of chuck as —A— with which it is to be used.

These flutes or grooves —5— are of uniform radial depth from end to end sufficient to extend the entire lengths of the pilots —2— as well as the main body —1—, and also extend inwardly beyond the shoulders —3— and are preferably of greater circumferential peripheral width than the peripheral width of the ribs —6— so as to permit the jaws of the chuck not shown, to engage the bases of the grooves without contacting with the cutting edges of the ribs presently described.

The shoulders —3— at each end of the ribs —6— are shown as disposed in planes at substantially right angles to the axis of the tool and are beveled in the same direction circumferentially to form cutting edges designated by the same reference numerals —3—, those at one end being beveled in a direction opposite those of the other end so as to permit either end edges to be used for counterboring purposes by simply reversing the tool in the same chuck and rotating it in the same direction particularly, when used for counterboring or reaming purposes.

When it is desired to use the tool for cuting interior and exterior surfaces, the peripheral faces of each half length of the main body —1— are beveled in one and the same direction circumferentially to form cutting edges —7— and for clearance purposes, the sides of the ribs facing in the same direction as the cutting edges —7—, being under cut as parts of the flutes or grooves —5— to form acute angles with the beveled peripheries and thereby to increase the cutting efficiency of said cutting edges, those of one half length being in a direction opposite those of the other half length so that the cutting edges of one half length of the main body, face in one direction, while those of the other half face in the opposite direction, thus permitting either end of the tool to be used for cutting interior and exterior surfaces by simply reversing said tool end for end in the chuck.

The peripheral faces of the ribs of the pilot members —2— are preferably concentric with the axis of the tool to permit said pilots to function as center guides for said tool without cutting the work as distinguished from the beveled or eccentric peripheral edges of the ribs —6— of the main body.

In some instances as for example, in finishing interior or exterior surfaces upon the work, the pilot members —2— may be omitted, but are generally retained to increase the range of use to which the tool may be put, but it is evident that in either case, when the cutting edges at one end become dull, the tool may be reversed end for end in the chuck, and the other end reversed to continue the work, all of which greatly increases the longevity of the tool as a whole and also increases its period of usefulness by such reversal.

I claim:

1. A cutting tool of the character described comprising an elongated main body having reduced extensions at both ends and flutes extending the entire length of the main body and extensions and forming substantially straight lengthwise ribs on both the main body and extensions, the ribs of the main body having their opposite end faces beveled transversely in opposite directions to form cutting edges extending outwardly beyond the ribs of the reduced extensions each rib having one side of one end undercut to form a cutting edge facing in one direction and the opposite side of its other end undercut to form a cutting edge facing in the opposite direction.

2. A cutting tool of the character described comprising an elongated main body having reduced extensions at both ends and flutes extending the entire length of the main body and extensions and forming substantially straight lengthwise ribs on both the main body and extensions, said extensions having portions thereof adjacent the main body cut away to form notches for the clearance of the material removed by cutting.

In witness whereof I have hereunto set my hand this 27th day of June, 1923.

CHARLES J. B. BORGESON.